(12) United States Patent
Talwalkar et al.

(10) Patent No.: US 7,035,364 B2
(45) Date of Patent: Apr. 25, 2006

(54) DIGITAL RECEIVER FAST FREQUENCY AND TIME ACQUISITION SYSTEM USING A SINGLE SYNCHRONIZATION WORD AND METHOD OF USING SAME

(75) Inventors: Sumit A. Talwalkar, Plantation, FL (US); Vijay Nangia, Schaumburg, IL (US); Leng H. Ooi, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 772 days.

(21) Appl. No.: 09/896,703

(22) Filed: Jun. 29, 2001

(65) Prior Publication Data

US 2003/0002597 A1    Jan. 2, 2003

(51) Int. Cl.
*H04L 7/00* (2006.01)
(52) U.S. Cl. ...................... 375/365; 375/316
(58) Field of Classification Search ................ 375/344, 375/316, 97, 118, 362, 341, 340, 365, 226, 375/326, 332, 376, 354, 343, 364, 369, 324, 375/329, 371; 370/19, 69.1, 100.1, 350, 370/509, 516, 208, 503, 252, 332, 512, 476, 370/209, 342, 441; 455/182.2, 182.3; 348/375; 329/308, 309, 304, 310; 708/311, 404, 405
See application file for complete search history.

(56) References Cited

U.S. PATENT DOCUMENTS 5,131,008 A * 7/1992 Kazecki et al. ............. 375/344
5,272,446 A * 12/1993 Chalmers et al. ........... 329/304

(Continued)

OTHER PUBLICATIONS

Robust time-frequency synchronization for OFDM mobile applications□□Kleider; Humphrey;□□Signal Processing and Its Applications, 1999. ISSPA '99. Proceedings of the Fifth International Symposium on, vol.: 1, Aug. 22-25, 1999□□pp.: 423-426 vol. 1.*

(Continued)

*Primary Examiner*—Jay K. Patel
*Assistant Examiner*—Jacob Meek
(74) *Attorney, Agent, or Firm*—Barbara R. Doutre

(57) ABSTRACT

A digital receiver fast frequency and time acquisition system (200) for accurately providing both time and frequency synchronization to an incoming data stream with minimal delay to prevent any loss of incoming digital information. The invention provides synchronization with only a single synchronization word and includes a first channel select (CS) filter (204) that filters an incoming digital signal (202). A frame synchronization detector (206) then recognizes the time synchronization word from the first filtered signal. A coarse symbol time estimator (208) is then used for coarsely adjusting the time synchronization of the digital signal from the frame synchronization detector (206) and a fine frequency estimator (210) finely adjusts the frequency of the signal from the coarse symbol time estimator (208) for providing a frequency adjusted signal. A mixer (212) then combines the incoming digital signal with the frequency adjusted signal and provides a time and frequency compensated digital signal. A second CS filter (214) filters the frequency compensated digital signal and a fine symbol time estimator (216) works to determine symbol timing with greater precision. Finally, a symbol detector (218) is used for interpreting the incoming digital signal.

15 Claims, 3 Drawing Sheets

U.S. PATENT DOCUMENTS

| | | | | |
|---|---|---|---|---|
| 5,440,267 A | * | 8/1995 | Tsuda et al. | 329/308 |
| 5,444,697 A | * | 8/1995 | Leung et al. | 370/207 |
| 5,550,812 A | * | 8/1996 | Philips | 370/203 |
| 5,715,240 A | * | 2/1998 | Borras et al. | 370/252 |
| 5,717,713 A | * | 2/1998 | Natali | 375/149 |
| 5,982,823 A | * | 11/1999 | Jacklin | 375/344 |
| 6,058,101 A | * | 5/2000 | Huang et al. | 370/208 |
| 6,373,858 B1 | * | 4/2002 | Soleimani et al. | 370/476 |
| 6,490,010 B1 | * | 12/2002 | Shibuya et al. | 348/735 |
| 6,618,452 B1 | * | 9/2003 | Huber et al. | 375/343 |
| 6,628,926 B1 | * | 9/2003 | van de Beek et al. | 455/75 |
| 6,680,932 B1 | * | 1/2004 | Hsuan et al. | 370/350 |
| 6,693,983 B1 | * | 2/2004 | Moher et al. | 375/341 |

OTHER PUBLICATIONS

Two-step Kalman-filter-based AFC for direct conversion-type receiver in LEO satellite communications☐☐Wannasarnmaytha, A.; Hara, S.; Morinaga, N.;☐☐Vehicular Technology, IEEE Transactions on, vol.: 49, Issue: 1, Jan. 2000 ☐☐pp.: 246-253.*

OFDM burst frequency synchronization by single carrier training data Lambrette, U.; Speth, M.; Meyr, H.; Communications Letters, IEEE vol. 1, Issue 2, Mar. 1997 Page (s):46-48.*

* cited by examiner

DIGITAL RECEIVER FAST FREQUENCY AND TIME ACQUISITION SYSTEM USING A SINGLE SYNCHRONIZATION WORD AND METHOD OF USING SAME

TECHNICAL FIELD

This invention relates in general to digital communications systems and more particularly to synchronization of digital information in a digital communications system.

BACKGROUND

Time and frequency synchronization is essential for reliable digital communications between the transmitting (Tx) and receiving (Rx) radios. As is known in the art, both transmitter and receiver should have the same nominal frequencies when communicating together. The receiver needs to "tune" within a certain tolerance to receive information exactly on the same frequency as the transmitter is transmitter in order to begin the demodulation process. This is commonly known as frequency synchronization and is required because the reference oscillators in the both radios (Tx and Rx) have different errors from the nominal frequency.

Similarly, time synchronization of incoming digital information is also required since the receiver does not know the boundaries between incoming data symbols. Thus, symbol time synchronization refers to the boundary between successive symbols or digital data bits in order to successfully detect the symbols. This invention addresses the problem of acquiring synchronization (both time and frequency) by using a single 5 millisecond (mS) long synchronization word. The solution for fast acquisition enables the operation of a transmit interrupt feature that is one of the distinguishing features of the new Digital Interchange of Information & Signaling (DIIS) standard that is intended to enable the transition from the analog technology in today's low tier Private Mobile Radio (PMR) systems. This type of system enables a higher speed (12 Kbps) digital communication supporting both speech and data. This is an evolution from an earlier European standard, Binary Interchange of Information and Signaling (BIIS) also known as ETS300.230.PMR protocol (DIIS).

The operation of a sync acquisition system depends on a known sequence of symbols that is periodically embedded in the transmit symbol bit stream. This sequence of symbols, already known to the receiver, is called the synchronization word. Any subsequent call related information is generally sent immediately after the sync word. In this way, any receiver when establishing initial communication starts looking for the sync word and call information to decide whether to participate in the communication or "call".

The functional diagram of a typical receiver may be similar to the one shown in prior art FIG. 1. A common issue associated with this type of receiver is acquisition time. Acquisition time is the time it takes to sync transmitted data with received data i.e. the time during which the receiver cannot receive data since it is not yet in sync with the transmitted data. Digital in-phase (I) and quadrature (Q) baseband (zero center frequency or low IF or very low IF) input signals 102 are input to a coarse automatic frequency control (AFC) 104 for bringing the range of the radio frequency (RF) input signal within the range of a sharp digital channel select (CS) filter 106.

Although depicted here having a 3 dB bandwidth at 3 KHz for the DIIS modulation, such CS filter is chosen to select the desired signal while rejecting any off-channel power. Without the coarse AFC 104 however, the digital signal might be shifted out of the CS passband in view of the frequency. Typically for DIIS modulation it is required to bring the digital I-Q input signal 102 within 600 Hz of the center frequency of the CS filter 106 or too much signal is lost.

The filtered signal is then passed to frame sync detector 108 which is a device looking for a sequence of digital symbols that is known to the receiver apriori. Thus anytime the receiver detects energy within the IF filter passband, it begins the process of detecting a known sequence of bits for frame symbolization. By using the fine symbol time estimator 110, the receiver determines the boundary between symbols and also achieves frame synchronization (i.e. recognizes the known pattern of incoming bits of information).

Based on the time symbol estimation the receiver 100 will next do a fine frequency estimation to further reduce the frequency error between the transmitter and receiver frequencies. In order to properly decode data it is necessary to make this frequency error smaller than the tolerance of the symbol detection scheme. The tolerance could be as small as 10 Hz in case of coherent detection of DIIS signal or 100 Hz for non-coherent detection of DIIS signal. Since time synchronization has already been achieved, the fine frequency estimation works on known symbols using a fine frequency estimator 112. Since the coarse AFC 104 can only tune the incoming I-Q baseband signal to within 600 Hz, the fine frequency estimator 112 works to fine tune the frequency of incoming data to approximately with 10 Hz in order to property detect the incoming data symbol. This correction is applied to mixer 114 where it is mixed with the signal from the IF filter 106. The output of the mixer 114 is then applied to the symbol detector 116 where it is then properly detected.

The prior art receiver synchronization system as seen in FIG. 1 has several weaknesses. The CS filter with a 3 dB bandwidth at 3 KHz is typically required for meeting an adjacent channel interference protection requirement. With this 3 dB bandwidth, a maximum offset of 600 Hz is acceptable at the input of the IF filter. According to related standards specifications, a mobile transmitter frequency is allowed to be up to 1.5 KHz away from its nominal value for a channel separation of 12.5 KHz. If the baseband I-Q signal is directly fed to the CS filter, in the worst case, with a difference of 3 KHz between Tx and Rx, a significant part of the desired signal gets attenuated by the CS filter. This accounts for the coarse AFC 104 placed before the CS filter 106. The coarse AFC 104 is supposed to bring the filter offset down form 3 KHZ to 600 Hz. The coarse AFC 104 however has to operate on unknown data symbols before the sync word, for the sync word to pass through the IF filter. This ultimately leads to a greater than acceptable delay and a period in which no synchronization occurs where the receiver is unable to receive information.

As seen in FIG. 2, the prior art system shows the frequency of incoming data information being within 3 KHz without any correction at time T0 120. The coarse AFC 104 narrowing the frequency offset within 600 Hz at time 122 and the fine AFC 112 bringing the offset within 100 Hz at time T1 124 for non-coherent symbol detection. This results in a large receiver delay in being able to be on the correct frequency to detect incoming data.

Therefore the needs exists to provide a digital receiver synchronization system that can easily and accurately provide both time and frequency synchronization to an incoming data stream with minimal delay to prevent any loss of incoming digital information.

DETAILED DESCRIPTION OF THE PREFERRED EMBODIMENT

Figure 3:
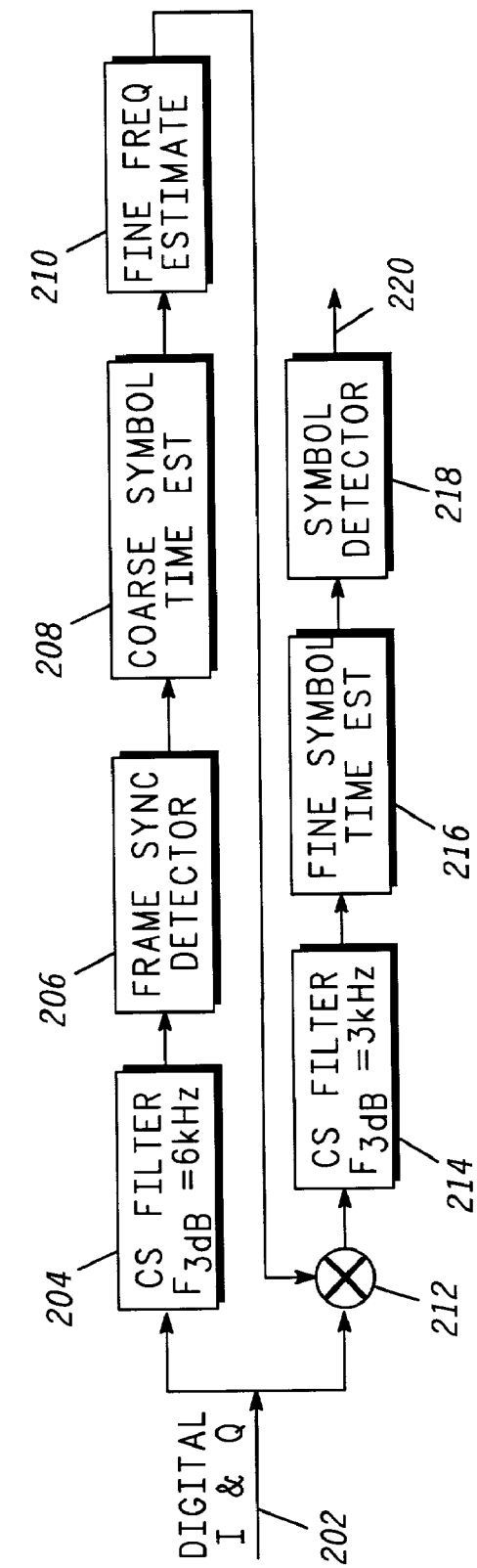
FIG. 3 is block diagram showing a time and frequency synchronization system using a single synchronization word according to the preferred embodiment of the invention.

Referring now to FIG. 3, the preferred embodiment of the fast frequency and time acquisition system 200 of the present invention includes an incoming digital baseband (zero center frequency or low IF or very low IF)in-phase (I) and quadrature (Q) signal 202 is input to a first wider channel select (CS) filter 204. The digital I-Q signal 202 is filtered through the first wider CS filter 204 with a 3 dB bandwidth of 6 KHz. This is twice the filter bandwidth typically used in the prior art systems and acts to filter out extraneous signals outside of the 6 KHz passband. As will be recognized by those skilled in the art, although a 6 KHz filter is depicted here, any such suitable bandwidth will act as an equivalent for the first wide CS filter.

The filtered signal from the first wide CS filter 204 is directed to a frame sync detector 206. The frame sync detector 206 as noted herein works to recognize a predetermined series of bits in order to synchronize incoming digital information.

Once frame sync is established by the frame sync detector 206, the received digital signal is directed to a series of devices to establish both time and frequency synchronization. Time synchronization is accomplished though the use of a coarse symbol time estimator 208. Due to the increased noise associated with the digital signal 202, the first symbol time estimator 208 can only make a coarse estimate of frequency synchronization. After the frame sync detection and a coarse symbol time estimation a fine frequency estimator 210 works to determine the receiver frequency to within the frequency error tolerance of the symbol detector. It should be noted that the frequency estimation 210 is less sensitive than the symbol detector 218 to symbol time estimation error. Thus, the frequency estimator 210 can obtain a fine estimate even with a coarse symbol time estimate out of 208.

It will further be recognized by those skilled in the art, that the frame synchronization detection symbol time estimation and frequency estimation all use the same part of the digital baseband I-Q signal 202 that corresponds to the synchronization word. Since, the frequency estimation is based on known sequence of digital symbols, it is relatively fast and accurate as compared to the coarse AFC as noted in the prior art.

The frequency correction from the fine frequency estimator 210 is then applied to the digital I-Q signal 202 using a digital mixer 212. This combined frequency corrected signal is then passed through a second CS filter 214 that is a narrower CS filter than the first wide CS filter. With the frequency correction applied, there is no danger of the second CS filter 214 attenuating an input signal with high offset. The filtered signal from the CS filter 214 is then used for symbol time estimation. This symbol time estimator 216 now provides a much finer and accurate frequency estimation since the narrower second CS filter 214 allows a much smaller amount of noise in the frequency estimation.

It will be evident to those skilled in the art that the first CS filter 204 and the second CS filter 214 may be implemented in FIR filters to maintain linear phase response. The wider first CS filter 204 should be chosen to have a 3 dB bandwidth of 6 KHz which is an integral multiple of the narrower second CS filter 214. Such a choice allows the taps of the wider first CS filter 204 to be derived from the narrower second CS filter 214. Every other tap of the narrower second CS filter 214 might be chosen to be a tap of the wider first CS filter 204. Thus, the addition of a filter would not come at the cost of any increased memory requirement.

Figure 1:
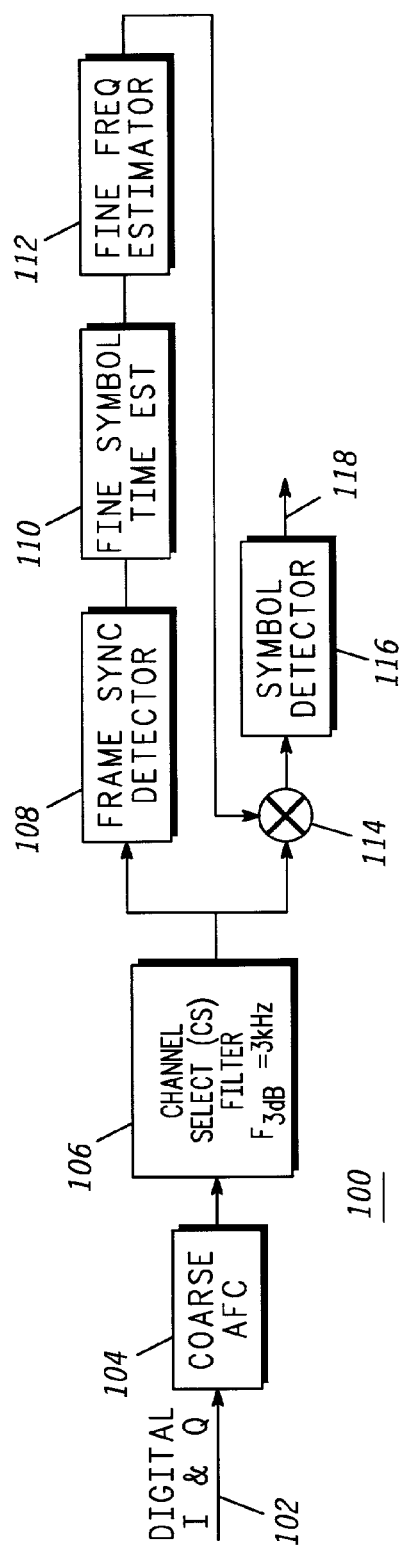
FIG. 1 is a prior art block diagram showing a system for time and frequency synchronization.
Figure 2:
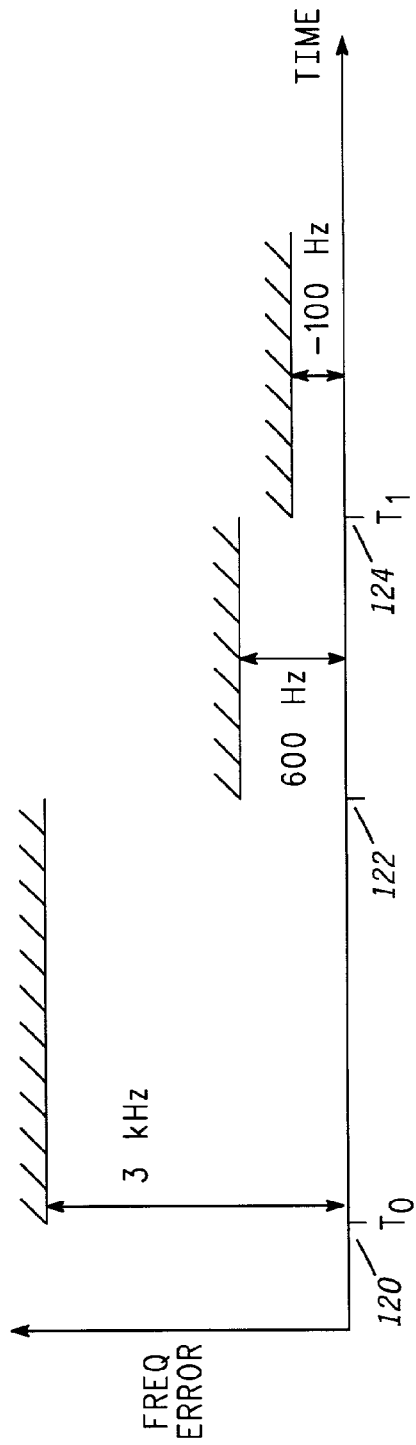
FIG. 2 is graph showing the time domain plot of the frequency error versus time of the prior art system as seen in FIG. 1.
Figure 4:
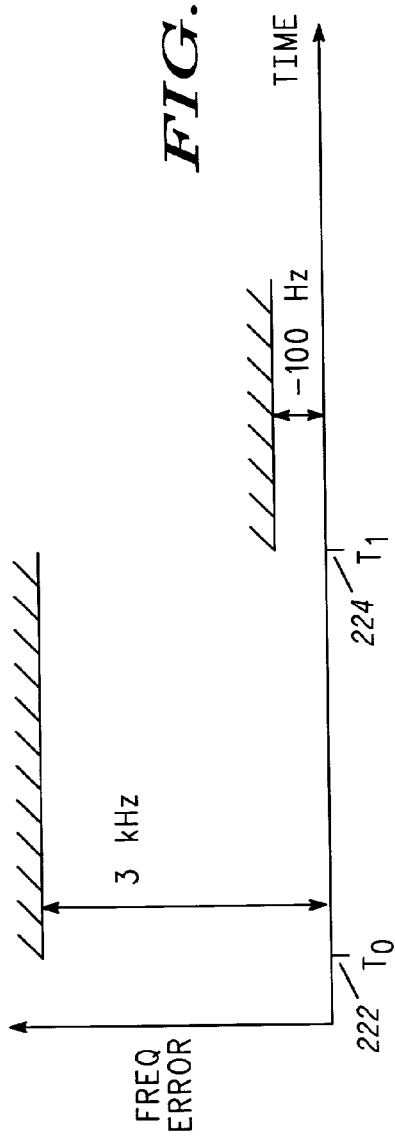
FIG. 4 is graph showing a time domain plot of the frequency error versus time of the time and frequency synchronization system according to the preferred embodiment of the invention.

As seen in the timing diagram of FIG. 4, minimum acquisition time as compared with FIG. 2, is generally reduced from time T0 222 to time T1 224. In practice this savings can be from approximately greater than 30 milliseconds to as small as 5 milliseconds. The savings in minimum acquisition time comes from the fact that coarse AFC, as noted in the prior art, does not have to be run on unknown symbols. Therefore the overall minimal time acquisition and frequency acquisition time can be accomplished much more rapidly to reduce the amount of time when a digital signal may not be detected due lack of synchronization.

Figure 5:
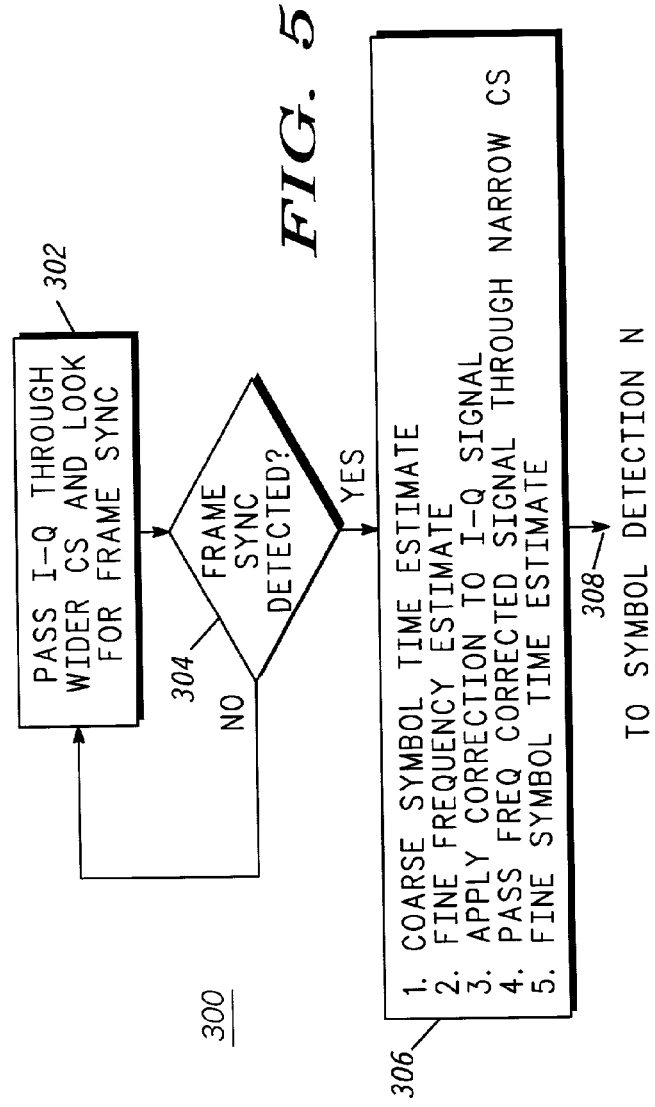
FIG. 5 is a flow chart showing the preferred method of the invention.

FIG. 5 illustrates a flow chart of the receiver time and frequency acquisition algorithm 300 of the invention. According to the preferred method of the invention, the digital I-Q signal is passed though a relatively wide first IF filter 302 where it looks for frame synchronization. Once the frame sync is detected 304, a series of acquisition steps are accomplished 306. First, a coarse symbol time estimate is done followed by a fine frequency estimate. This frequency correction is applied to the I-Q digital signal. The frequency corrected signal is directed through a second CS filter that is narrower than the first wide CS filter. By filtering the digital signal further a more precise fine symbol time estimate can be accomplished.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A digital receiver fast frequency and time acquisition system comprising:
    a first channel select (CS) filter filtering an incoming digital baseband signal;
    a frame synchronization detector for recognizing a single time synchronization word from the first filtered signal;
    a coarse symbol time estimator for coarsely determining the symbol time synchronization of the digital signal using the single time synchronization word after the frame synchronization detection;

a fine frequency estimator for finely determining the frequency error of the signal using the single time synchronization word after the coarse symbol time estimation for providing a frequency adjustment signal;

a mixer for combining the incoming digital baseband signal with the frequency adjustment signal and providing a frequency corrected digital signal;

a second CS filter for filtering the frequency corrected digital signal;

a fine symbol time estimator for determining symbol timing with greater precision of the filtered signal from the second CS filter using the single time synchronization word;

a symbol detector for interpreting the digital signal after the fine symbol time estimation; and wherein the system operates without the use of an automatic frequency control.

2. A digital receiver fast frequency and time acquisition system as in claim 1, wherein the first CS filter has a wider bandwidth than the second CS filter.

3. A digital receiver fast frequency and time acquisition system as in claim 1, wherein the second CS filter has exactly half (or any other simple fractions such as one third, or one fourth etc) the bandwidth of the first CS filter.

4. A digital receiver fast frequency and time acquisition system as in claim 1, wherein the first CS filter has a 3 decibel (dB) bandwidth of approximately 6 Kilohertz (KHz).

5. A digital receiver fast frequency and time acquisition system as in claim 4, wherein the second CS filter has a 3 decibel (dB) bandwidth of approximately 3 Kilohertz (KHz).

6. A fast frequency and time acquisition system for synchronizing digital information for use with a digital radio frequency (RF) receiver comprising:

a first channel select (CS) filter for filtering digital baseband information;

a frame synchronization detector for detecting a single synchronization word in the digital baseband information from the first CS filter;

a coarse symbol time estimator for coarsely determining the symbol time of the digital signal using the single time synchronization word after the frame synchronization detection;

a fine frequency estimator for finely determining the frequency error of the signal using the single time synchronization word after the coarse symbol time estimation for providing frequency adjustment;

a mixer for combining the unfiltered digital information with the frequency error estimate to provide a mixed frequency corrected digital signal;

a second CS filter for filtering the mixed digital signal;

a fine symbol time estimator for finely determining the symbol time of the signal from the second CS filter using the single time synchronization word; and a symbol detector for decoding the digital signal from the fine symbol time estimation and;

wherein the system operates without the use of an automatic frequency control.

7. A digital receiver fast frequency and time acquisition system as in claim 6, wherein the first CS filter has a wider bandwidth than then second CS filter.

8. A digital receiver fast frequency and time acquisition system as in claim 6, wherein the second CS filter has exactly half (or any other simple fractions such as one third, or one fourth etc) the bandwidth of the first CS filter.

9. A digital receiver fast frequency and time acquisition system as in claim 6, wherein the first CS filter has a 3 decibel (dB) bandwidth of approximately 6 Kilohertz (KHz).

10. A digital receiver fast frequency and time acquisition system as in claim 9, wherein the second CS filter has a 3 decibel (dB) bandwidth of approximately 3 Kilohertz (KHz).

11. A method for rapidly acquiring time and frequency synchronization for a digital RF baseband signal comprising the steps of:

directing a digital baseband signal to a first channel select (CS) filter;

detecting a single time synchronization word in the digital signal from the first CS filter;

determining a coarse symbol time estimate of the signal from the first CS filter using the single time synchronization word;

determining a fine frequency error estimate of the digital signal using the single time synchronization word after the coarse symbol time estimation, applying a frequency correction to the digital signal to provide a frequency corrected signal via a mixer;

applying the frequency corrected signal to a second CS filter;

determining a fine symbol time estimate of the signal from the second CS filter using the single time synchronization word;

applying a fine time correction to the signal from the second IF filter;

detecting the symbols from the fine time corrected signal; and wherein the steps of directing a digital baseband signal through detecting the symbols are performed without using an automatic frequency control.

12. A digital receiver fast frequency and time acquisition system as in claim 11, wherein the first CS filter has a wider bandwidth than then second CS filter.

13. A digital receiver fast frequency and time acquisition system as in claim 11, wherein the second CS filter has exactly half the bandwidth of the first CS filter.

14. A digital receiver fast frequency and time acquisition system as in claim 11, wherein the first CS filter has a 3 decibel (dB) bandwidth of approximately 6 Kilohertz (KHz).

15. A digital receiver fast frequency and time acquisition system as in claim 14, wherein the second CS filter has a 3 decibel (dB) bandwidth of approximately 3 Kilohertz (KHz).

* * * * *